Figure 1:
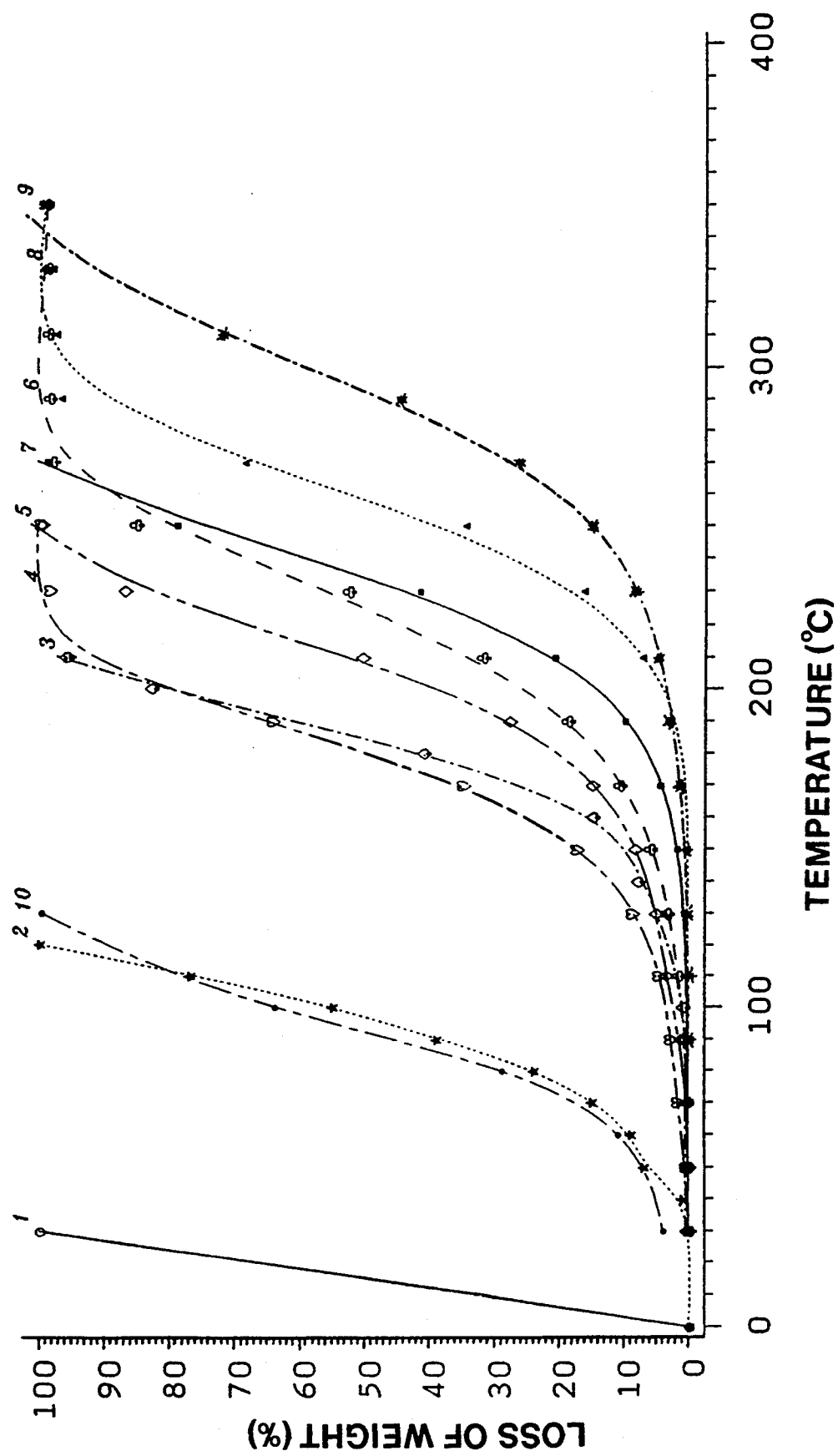

United States Patent [19]
Sultan et al.

[11] Patent Number: 5,350,812
[45] Date of Patent: Sep. 27, 1994

[54] SILANE-CROSSLINKABLE POLYMER COMPOSITION CONTAINING A SILANE COMPOUND AS A PRECURING RETARDER

[75] Inventors: Bernt-Åke Sultan, Göteborg; Lars E. Ahlstrand, Stenungsund, both of

[73] Assignee: Neste OY, Espoo, Finland

[21] Appl. No.: 89,418

[22] Filed: Jul. 9, 1993

Related U.S. Application Data

[63] Continuation of Ser. No. 720,535, Jun. 19, 1991, abandoned.

[30] Foreign Application Priority Data

Dec. 23, 1988 [SE] Sweden .............................. 8804639.6

[51] Int. Cl.$^5$ .............................................. C08L 83/05
[52] U.S. Cl. .................................... 525/477; 524/265; 524/267; 525/288; 528/18
[58] Field of Search ................ 524/265, 267; 525/288, 525/477; 528/18

[56] References Cited

U.S. PATENT DOCUMENTS

| | | | |
|---|---|---|---|
| 4,043953 | 8/1977 | Chang et al. | 525/100 |
| 4,202,812 | 5/1980 | Murray | 524/266 |
| 4,689,369 | 8/1987 | Ishino et al. | 525/288 |
| 4,795,786 | 1/1989 | Umpleby | 525/326.5 |
| 4,983,675 | 1/1991 | Ishino et al. | 525/100 |

*Primary Examiner*—Paul R. Michl
*Assistant Examiner*—John J. Guarriello
*Attorney, Agent, or Firm*—Merchant, Gould, Smith, Edell, Welter & Schmidt

[57] ABSTRACT

A crosslinkable polymer composition comprises an olefin copolymer or graft copolymer with hydrolysable saline groups and a silanol condensation catalyst, as well as a silane compound with at least one hydrolysable organic group. The polymer composition is characterized in that the silane compound has a compatibility with the polymer composition of at least 0.035 mole hydrolysable groups per 100 g polymer composition, and in that the silane compound is represented by the general formula: $R^1(SiR^2{}_nX_{3-n})_m$, wherein $R^1$ is a monofunctional hydrocarbyl group having 13–30 carbon atoms, or a difunctional hydrocarbyl group having 4–24 carbon atoms, $R^2$ is a hydrocarbyl group having 1–10 carbon atoms, X is a hydrolysable organic group, n is 0, 1 or 2, and m is 1 or 2.

10 Claims, 4 Drawing Sheets

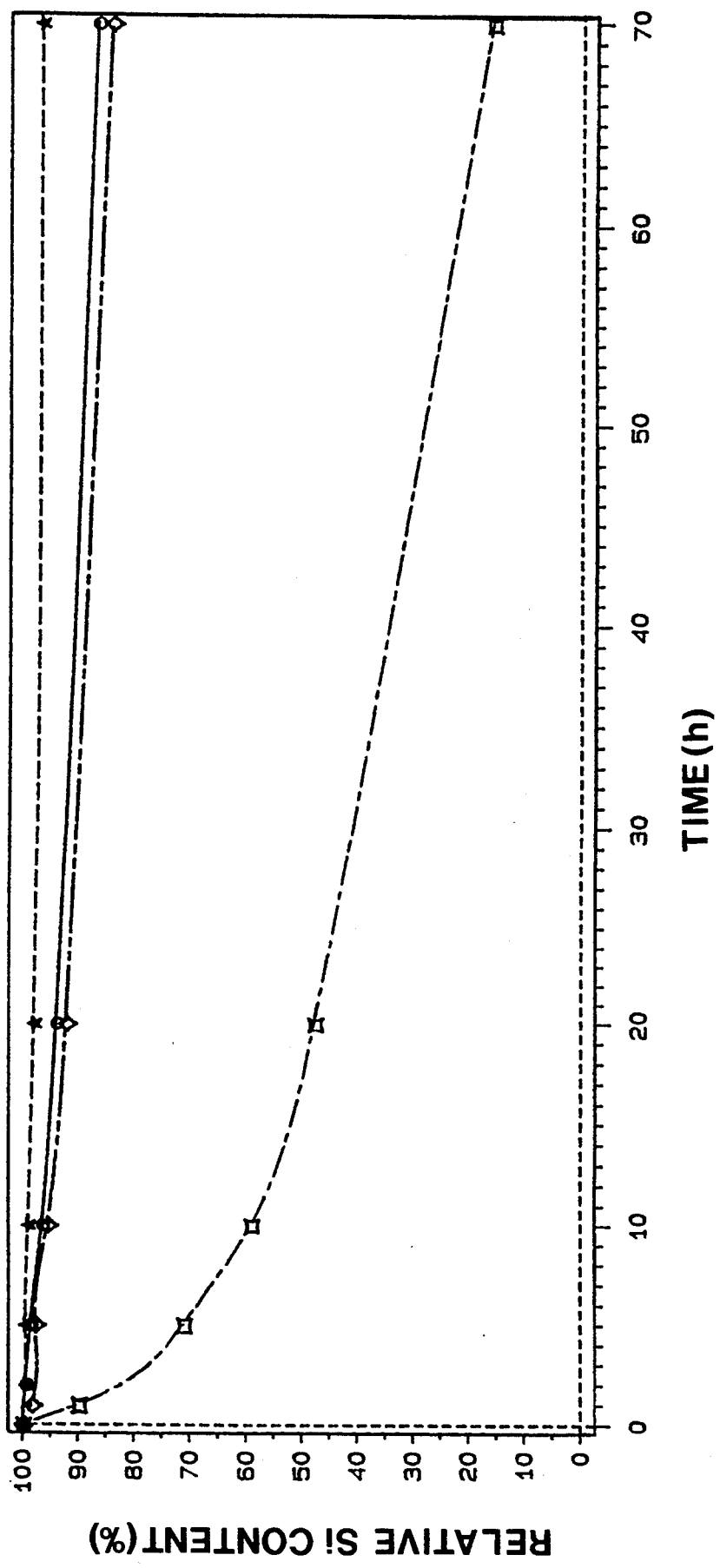
FIG._4

SILANE-CROSSLINKABLE POLYMER COMPOSITION CONTAINING A SILANE COMPOUND AS A PRECURING RETARDER

This is a continuation of application Ser. No. 07/720,535, filed Jun. 19, 1991 now abandoned.

The present invention relates to a crosslinkable polymer composition comprising an olefin copolymer or graft polymer with hydrolysable silane groups and a silanol condensation catalyst, as well as a silane compound with at least one hydrolysable organic group.

It is known to crosslink different polymers by means of additives. The crosslinking improves the properties of the polymer, such as its mechanical strength and heat resistance. Polymers normally considered to be thermoplastics and not crosslinkable can also be crosslinked by introducing crosslinkable groups in the polymer. An example thereof is the crosslinking of polyolefins, such as polyethylene. A silane compound can be introduced as a crosslinkable group, e.g. by grafting the silane compound onto the prepared polyolefin, or by copolymerisation of the olefin and the silane compound. This technique is previously known, and further details may be found in U.S. Pat. Nos. 4,413,066, 4,297,310, 4,351,876, 4,397,981, 4,446,283 and 4,456,704, all of which are incorporated herein by reference.

The processing of the crosslinkable silane-containing polymer material is, however, not without difficulties. In processing by, for example, extrusion, it is important that the crosslinking is not carried out until after the mixture has left the extruder, since a too early crosslinking or precuring makes it impossible to maintain a uniform production capacity, and furthermore the quality of the resulting product will be unsatisfactory. An incipiant crosslinking or precuring already in the extruder (or other corresponding equipment) entails gelation and adhesion of polymer gel to the surfaces of the equipment, with ensuing risks of clogging. To counteract this, the equipment has to be cleaned from adhering polymer gel, and for every cleaning operation the equipment must be shut down, which entails a fall in production.

Another disadvantage is that any gel lumps which do not clog the production equipment, are discharged and occur in the product in the form of disfiguring and unwanted clots. In thin layers, for example films and foils, such lumps are unacceptable and in most cases make the product unusable.

The unwanted precuring can be counteracted by incorporating in the polymer composition substances counteracting precuring, so-called precuring retarders.

Thus, it is known, for example from EP 0,193,317 hereby incorporated as reference, to counteract the precuring of a crosslinkable, silane-containing copolymer composition comprising ethylene, an etylenically unsaturated silane compound having a hydrolysable organic group and, optionally, another copolymerisable monomer, and a silanol condensation catalyst, by adding to the composition a precuring retarder in the form of 0.01-5 parts by weight of a silane compound with a hydrolysable organic group. The silane compound employed as precuring retarder may be saturated or unsaturated but is, according to the above-mentioned patent, preferably the same unsaturated silane compound which is included in the copolymer composition. The most preferred silane compounds are vinyltrimethoxy silane, vinyltriethoxy silane, and gamma-methacryloxypropyltrimethoxy silane.

Furthermore, it is known from EP 0,007,765 to stabilise a polymeric organosilane composition against viscosity increase and gelation by the addition thereto of a monomeric hydrolyrically reactive organosilane compound represented by the formula $R''_{(4-x)}SiX_x$, wherein X is a specified hydrolysable group, x is 1–4, and R'' is a monovalent organic radical having 1–12 carbon atoms.

Furthermore, it is known from EP 0,245,938 to produce a composition comprising a crosslinkable silyl polymer and a filler and having a reduced tendency to premature crosslinking of the silyl polymer, by adding to the composition a water scavenger chosen from one or more of: organic orthoesters, organic acetals, organic ketals or silanes represented by the formula $R_9R_{10}R_{11}Si$—$(OSiR_{12}R_{13})m$—$R_{14}$, wherein $R_9$, $R_{10}$, $R_{11}$, $R_{12}$, $R_{13}$ and $R_{14}$ are the same or different and are chosen from hydrogen, hydrocarbyl, and oxyhydrocarbyl, m is 0 or 1–10, and not more than one R group per silicon atom is hydrogen. Bismethoxyldimethylsiloxane and octyltrimethoxy silane are mentioned as examples of suitable silane water scavengers. The most preferred water scavenger is an alkyl orthoformate.

Finally, it is known from U.S. Pat. No. 4,043,953 to produce a moisture-curable coating composition comprising a copolymer of an ethylenically unsaturated monomer and a copolymerisable organoalkoxy silane, and a curing accelerating catalyst, the pot-life of the composition being increased by adding to the composition 0.5–15% by weight of a monomeric hydrolyrically reactive organosilane compound represented by the formula $X_nSi(OR)_{4-n}$, wherein X is an organic radical having 1–12 carbon atoms, R is methyl, ethyl, 2-methoxyethyl, 2-ethoxyethyl or an acyl group having not more than 5 carbon atoms, and n is 0, 1 or 2.

The precuring retarders according to the abovementioned prior art technique do not, however, present a satisfactory solution to the problem of unwanted precuring of crosslinkable silane polymers. Despite the addition of a precuring retarder, these problems still occur, especially after storage, presumably because the precuring retarder is volatilised from the polymer composition, especially at a raised temperature, such that the precuring retarder content in the composition is reduced, as is the precuring counteracting effect. For several reasons, this constitutes a serious problem. A homogeneous admixing of additives, thus including the precuring retarder, presupposes that the polymer is in a melted state, i.e. has a temperature between 130° C. and 300° C. Similar conditions are prevalent when the polymer raw material is processed to the finished product. In both cases, there is normally a slow cooling procedure after processing. Furthermore, the compounded polymer raw material should be able to withstand at least several months of storage before being processed to a formed product.

Special and expensive equipment is required for the processing, if one wants to suppress the escape of known precuring retarders. For the same reason, special, gas-tight packaging materials are necessary for storing the polymer. To indicate the extent of the escape of conventional precuring retarders, it may be mentioned that more than 50% of the original amount of precuring retarder has disappeared after 6 hours of storage at 60° C. Not only does this have a negative influence on the precuring counteracting effect and entail a costly loss of retarder, the escaping precuring retarder also has an unpleasant smell and may constitute a health hazard. This is a considerable disadvantage, e.g. if the material is to be used in contact with food products.

Accordingly, it would be advantageous to use a precuring retarder which, in the above-mentioned conditions, does not escape from the polymer composition, but is substantially retained therein for maximum counteraction on the precuring counteracting effect.

In the present invention, one has unexpectedly discovered that this can be achieved by using certain specific silane compounds with at least one hydrolysable organic group as precuring retarder. The silane compounds according to the invention are characterised in that they are highly compatible with the polymer compositions in which they are used, and this compatibility is achieved by the silane compounds having a specific, defined structure with sufficiently large, nonpolar groups. More particularly, the silane compound used in the cross-linkable polymer composition according to the invention and mentioned by way of introduction, is characterised in that its compatibility with the polymer composition is at least 0.035 mole hydrolysable groups per 1000 g polymer composition, the compatibility being defined as the residual content which is determined indirectly by measuring the decrease in weight of the composition in moles of hydrolysable groups per 1000 g polymer composition and which, with an initial content of 0.060 mole hydrolysable groups per 1000 g polymer composition, after storage for 74 h at 60° C. in air still has not volatilised, and in that the silane compound is represented by the general formula:

$$R^1(SiR^2{}_nX_{3-n})_m \qquad (I)$$

wherein $R^1$ is a monofunctional hydrocarbyl group having 13-30 carbon atoms, or a difunctional hydrocarbyl group having 4-24 carbon atoms, $R^2$ which may be same or different, is a hydrocarbyl group having 1-10 carbon atoms, X which may be same or different, is a hydrolysable organic group, n is 0, 1 or 2, and m is 1 or 2.

These and other characteristics of the invention will be apparent from the appended subclaims.

Accordingly, the new precuring retarder according to the present invention differs from prior art precuring retarders in that it has a higher and defined compatibility. The lowest solubility or compatibility distinguishing the invention, is based upon the discovery that the escape of the precuring retarder from the polymer composition is mainly due to the insufficient compatibility between the precuring retarder and the polymer composition, and not, as one might believe, due to the boiling point of the precuring retarder, which however is a contributing factor, such that the escape of the precuring retarder from the polymer composition further increases as the boiling point is lowered. Correspondingly, the escape increases at raised temperatures. Thus, a precuring retarder having an insufficient compatibility with the polymer composition escapes swiftly from the latter, and the escape is accelerated if the precuring retarder has a low boiling point and the polymer composition is exposed to raised temperatures. If, however, one chooses a precuring retarder having a satisfactory compatibility with the polymer composition, the escape of the precuring retarder is counteracted, and it is possible to maintain an efficient precuring retarder content in the polymer composition. According to the invention, the precuring retarder should be present in an amount corresponding to at least about 0.035 mole hydrolysable groups/kg polymer composition so as to efficiently counteract the precuring. Consequently, this content is the lowest compatibility required according to the invention. To indicate the minimum compatibility between the silane compound and the polymer composition, one may therefore state that the decrease in weight of the polymer composition with an admixed initial content of the silane compound corresponding to 0.060 mole hydrolysable groups/1000 g polymer, after storage for 74 h at 60° C. in air, may correspond, at the most, to a decrease in the content of hydrolysable groups to a value corresponding to 0.035 mole hydrolysable groups/1000 g polymer. An upper limit to the compatibility of the precuring retarder has not been stated, since it is obvious that the higher the compatibility of the precuring retarder, the greater the advantage to the composition.

The hydrolysable silane compounds according to the invention satisfy to the full the requirement for compatibility between the precuring retarder and the polymer composition.

In the method according to the invention, the precuring retarder is added to the polymer composition and uniformly distributed therein.

If the precuring retarder is a solid, it can be added to the polymer composition in the form of a powder and be homogeneously distributed in the polymer composition by kneading it together with said composition. The kneading may for example be carried out in an extruder.

If the precuring retarder is a liquid, the addition may be carried out in the same manner as with the solid, i.e. by kneading with the polymer composition, e.g. in an extruder. It is then also possible to carry out the addition by impregnating the polymer composition with the precuring retarder, e.g. by spraying the precuring retarder, preferably atomised through a nozzle over the polymer composition which usually is in the form of pellets or a powder. During spraying of the precuring retarder, the polymer composition may, if so desired, be mixed or tumbled, to further improve the distribution of the precuring retarder. If the temperature is suitable, the satisfactory compatibility with the polymer produces an efficient migration of the retarder into the polymer phase.

The addition of the precuring retarder to the polymer composition may be carried out at ambient temperature, e.g. if the precuring retarder is a liquid, or at a raised temperature. Suitably, the raised temperature is chosen such that at least the precuring retarder is liquefied, preferably a temperature of about 50°-370° C., most preferred about 60°-200° C.

The time for the addition and distribution of the precuring retarder in the polymer composition is not critical, but is chosen such that a desired level of homogeneous distribution is achieved.

The new precuring retarders according to the invention will be described in detail below, but first a description will be given of the polymer compositions with which the precuring retarders can be used.

As mentioned earlier, the polymer composition according to the invention consists of a crosslinkable polymer composition composed of an olefin polymer with hydrolysable silane groups and a silanol condensation catalyst. More particularly, the invention is restricted to silane-containing olefin copolymer material or graft polymer material crosslinked under the action of water and a silanol condensation catalyst.

The crosslinkable polymer composition according to the invention comprises a silane-containing copolymer or graft polymer, by which is meant an olefin polymer, preferably an ethylene homopolymer or ethylene copolymer containing crosslinkable silane groups which have been introduced either by copolymerisation or graft polymerisation.

Preferably, the silane-containing polymer has been obtained by a copolymerisation of an olefin, suitably ethylene, and an unsaturated silane compound represented by the formula:

$$RSiR'_nY_{3-n} \qquad (II)$$

wherein
R is an ethylenically unsaturated hydrocarbyl, hydrocarbyloxy or (meth)acryloxyhydrocarbyl group,
$R^1$ is an aliphatic saturated hydrocarbyl group,
Y which may be the same or different, is a hydrolysable organic group, and
n is 0, 1 or 2.

If there is more than one Y group, these groups do not have to be identical.

Preferred examples of the unsaturated silane compound are those wherein R is vinyl, allyl, isopropenyl, butenyl, cyclohexenyl or gamma-(meth)acryloxypropyl, Y is methoxy, ethoxy, formyloxy, acetoxy, propionyloxy or an alkyl or arylamino group, and R' is a methyl, ethyl, propyl, decyl, or phenyl group.

A preferred unsaturated silane compound is represented by the formula:

$$CH_2=CHSi(OA)_3 \qquad (III)$$

wherein A is a hydrocarbyl group having 1-8 carbon atoms, preferably 1-4 carbon atoms.

The most preferred compounds are vinyltrimethoxy silane, vinylbismethoxyethoxy silane, vinyltriethoxy silane, gamma-(meth)acryloxypropyltrimethoxy silane, gamma-(meth)-acryloxypropyltriethoxy silane and vinyltriacetoxy silane.

The copolymerisation of the olefin (ethylene) and the unsaturated silane compound may be carried out under any conditions resulting in a copolymerisation of the two monomers.

Furthermore, the copolymerisation may be carried out in the presence of one or more further comonomers which are copolymerisable with the two monomers and which, for example, consist of: (a) vinylcarboxylate esters, such as vinyl acetate and vinyl pivalate, (b) alpha olefins, such as propylene, butene-1, 1-hexene, 1-octene, and 4-methyl-1-pentene, (c) (meth)acrylates, such as methyl(meth)acrylate, ethyl(meth)acrylate and butyl(meth)acrylate, (d) olefinically unsaturated carboxyl acids, such as (meth)acrylic acid, maleic acid and fumaric acid, (e) (meth)acrylic acid derivatives, such as (meth)acrylonitrile and (meth)acrylamide, (f) vinyl ethers, such as vinylmethyl ether and vinylphenyl ether and (g) aromatic vinyl compounds, such as styrene and alfa-methyl styrene. Preferred comonomers are vinyl esters of monocarboxylic acids having 1-4 carbon atoms, such as vinyl acetate, and (meth)acrylate of alcohols having 1-4 carbon atoms, such as methyl(meth)acrylate. Especially preferred comonomers are butyl acrylate, ethyl acrylate and methyl acrylate. Two or more of these olefinically unsaturated compounds may be used in combination. The expression "(meth)acrylic acid" used herein is intended to include both acrylic acid and methacrylic acid. The comonomer content in the copolymer may amount to 40% by weight, preferably about 0.5-35% by weight, most preferred about 1-25% by weight.

When use is made of a graft polymer for the compounding with the precuring retarder, the graft polymer may, for example, be produced according to any of the two methods described in U.S. Pat. No. 3,646,155 or U.S. Pat. No. 4,117,195.

The silane-containing polymer according to the invention has a silane compound content of 0.001-15% by weight, preferably 0.01-5% by weight, most preferred 0.1-3% by weight.

The crosslinking of the polymer is carried out by a so-called moist curing, the silane group being hydrolysed under the action of water, alcohol being split off and silanol groups being formed. Subsequently, the silanol groups are crosslinked under the action of a so-called silanol condensation catalyst, by means of a condensation reaction during which water is split off.

Generally, all silanol condensation catalysts may be used in the invention. More particularly, however, they are chosen among carboxylates of metals, such as tin, zinc, iron, lead and cobalt, organic bases, inorganic acids and organic acids.

Special examples of silanol condensation catalysts are dibutyl tin dilaurate, dibutyl tin diacetate, dioctyl tin dilaurate, stannous acetate, stanneous caprylate, lead naphthenate, zinc caprylate, cobalt naphthenate, ethyl amines, dibutyl amine, hexyl amines, pyridine, inorganic acids, such as sulphuric acid and hydrochloric acid, and organic acids, such as toluene sulphonic acid, acetic acid, stearic acid and maleic acid. Especially preferred catalyst compounds are the tin carboxylates.

The amount of the silanol condensation catalyst is generally in the order of 0.001-10% by weight, preferably 0.005-3% by weight, especially 0.01-1% by weight, in relation to the total weight of the composition.

As is usually the case with polymer compositions, the crosslinkable polymer may contain various additives, such as miscible thermoplastics, stabilisers, lubricants, fillers, colouring agents, and foaming agents.

As examples of additives in the form of miscible thermoplastics one may mention miscible polyolefins, such as polyethylene of low density, medium density, and high density, polypropene, chlorinated polyethylene, and various copolymers comprising ethylene and one or more other monomers (e.g. vinyl acetate, methyl acrylate, propene, butene, hexene and the like). The above-mentioned polyolefin may be used alone or as a mixture of several polyolefins. The polyolefin content in the composition may amount to 70% by weight, based on the sum of the amounts of this polyolefin and the silane-containing polymer.

As examples of fillers, one may mention inorganic fillers, such as silicates, e.g. kaolin, talc, montmorillonite, zeolite, mica, silica, calcium silicate, asbestos, powdered glass, glass fibre, calcium carbonate, gypsum, magnesium carbonate, magnesium hydroxide, carbon black, titanium oxide and the like. The content of this inorganic filler may amount to 60% by weight, based on the sum of the weights of the filler and the silane-containing polymer.

Finally, it should be pointed out that the polymer composition used in the invention is previously known, and that what is new and characteristic about the invention is not this polymer composition, but the special precuring retarder which is added to the polymer composition. This precuring retarder will now be described in more detail.

As mentioned earlier, the precuring retarder consists of a silane compound with at least one hydrolysable organic group, said silane compound being characterised in that it has a compatibility as defined above with the polymer composition of at least 0.035 mole hydrolysable groups/kg polymer, and that it satisfies the general formula (I).

In addition to these critical properties, the precuring retarder should also have a melting point not exceeding about 300° C., the reason therefor being that the polymer composition as well as the precuring retarder should be in liquid state when the retarder is admixed so that one may obtain as homogeneous a distribution as possible. Furthermore, the boiling point should not be below about 150° C. so that the volatility will not be too high. The higher the boiling point, the lower the volatility of the precuring retarder, which is conducive to reducing the escape of the precuring retarder from the polymer composition, as has been mentioned earlier. The lower limit of about 150° C. is chosen in view of the fact that temperatures of this order are common in normal processing.

More specifically, the precuring retarder according to the invention of the formula (I) may be divided in two types of silane compounds, i.e. silane compounds having one silicon atom and silane compounds having two silicon atoms. The first type of silane compounds with one silicon atom (m is 1 in formula I) may be represented by the formula $$R^1SiR^2{}_nX_{3-n} \qquad (IV)$$

wherein $R^1$ is a monofunctional hydrocarbyl group having 13-30 carbon atoms, preferably 13-20 carbon atoms, $R^2$ which may be the same or different, is a hydrocarbyl group having 1-10 carbon atoms, preferably 1-7 carbon atoms.

X which may be the same or different, is a hydrolysable organic group, suitably a hydrocarbyloxy group having 1-5 carbon atoms, preferably an alkoxy group having 1-5 carbon atoms, and n is 0, 1 or 2, preferably 0.

Furthermore, it is preferred that $R^1$ is a saturated straight or branched hydrocarbyl group, preferably a saturated straight-chained alkyl group. Correspondingly, it is preferred that $R^2$ is a saturated straight or branched hydrocarbyl group, preferably a saturated straight-chained alkyl group, and that all $R^2$ are the same. As regards the hydrolysable group X, it is preferred that all X are the same and are chosen from the groups methoxy, ethoxy, propoxy, butoxy, and pentoxy, methoxy being the most preferred hydrolysable group. Furthermore, it is preferred that three hydrolysable groups are bound to the silicon atom, i.e. that n in formula (IV) is 0 and that $R^2$ is missing, since this increases the efficiency of the precuring retarder. The most preferred silane compounds of formula (IV) may be summarised in formula (V)

$$CH_3(CH_2)_pSi(OCH_3)_3 \qquad (V)$$

wherein p is 13, 15 or 17.

At present, the compounds of formula (V) are the most preferred precuring retarders according to the present invention.

These compounds have melting points below or equalling room temperature, and boiling points over 200° C at atmospheric pressure, which means that they are liquid at the normal handling temperatures and thus may easily be admixed to the polymer composition. Moreover, the comparatively high boiling points entail a low volatility of the compounds. As a comparison, it may be mentioned that compounds having more than 20 carbon atoms in the carbon chain bound to the silicon atom tend to be solids at normal temperatures (about 25° C.), which may cause handling difficulties at low temperatures. The upper limit of the hydrocarbyl group belonging to the silane compound has been set at 30 carbon atoms since it is very complicated to produce higher homologues.

The other type of silane compounds, i.e. the compounds comprising two silicon atoms (m is 2 in formula I), may be represented by the formula:

$$X_{3-n}R^2{}_nSi-R^1-SiR^2{}_nX_{3-n} \qquad (VI)$$

wherein $R^1$ is a difunctional hydrocarbyl group having 4-24 carbon atoms, preferably 8-16 carbon atoms, most preferred 8-14 carbon atoms, $R^2$ which may be the same or different, is a hydrocarbyl group having 1-10 carbon atoms, preferably 1-7 carbon atoms, X which may the same or different, is a hydrolysable, organic group, suitably a hydrocarbyloxy group having 1-5 carbon atoms, preferably an alkoxy group having 1-5 carbon atoms, and n is 0, 1 or 2, preferably 0.

Furthermore, it is preferred that $R^1$ is a saturated straight or branched hydrocarbyl group, preferably a saturated straight-chained alkyl group. Correspondingly, it is preferred that $R^2$ is a saturated straight or branched hydrocarbyl group, preferably a saturated straight-chained alkyl group, and that all $R^2$ are the same. As regards the hydrolysable group X, it is preferred that all X are the same and are chosen from the groups methoxy, ethoxy, propoxy, butoxy and pentoxy, methoxy being the most preferred hydrolysable group. Moreover, it is preferred that three hydrolysable groups are bound to every silicon atom, i.e. that n in formula (VI) is 0, and consequently that $R^2$ is missing since this increases the efficiency of the retarder.

Evidently, the hydrocarbyl group $R^1$ in formulae I, IV and VI, above, may be unsubstituted as well substituted, but is preferably unsubstituted. Among the substituents which can be included in $R^1$, mention may be made of groups such as epoxy, ether, amine or diamine, carbamide, amide, halide, methacrylate or acrylate, vinyl and the like. Preferably, the substituents are attached to silicon by means of a hydrocarbon link.

The preferred silane compounds of formula (VI) may be summarised in formula (VII)

$$(CH_3O)_3Si(CH_2)_qSi(OCH_3)_3 \qquad (VII)$$

wherein q is 8-16, preferably 8-14.

Figure 2:
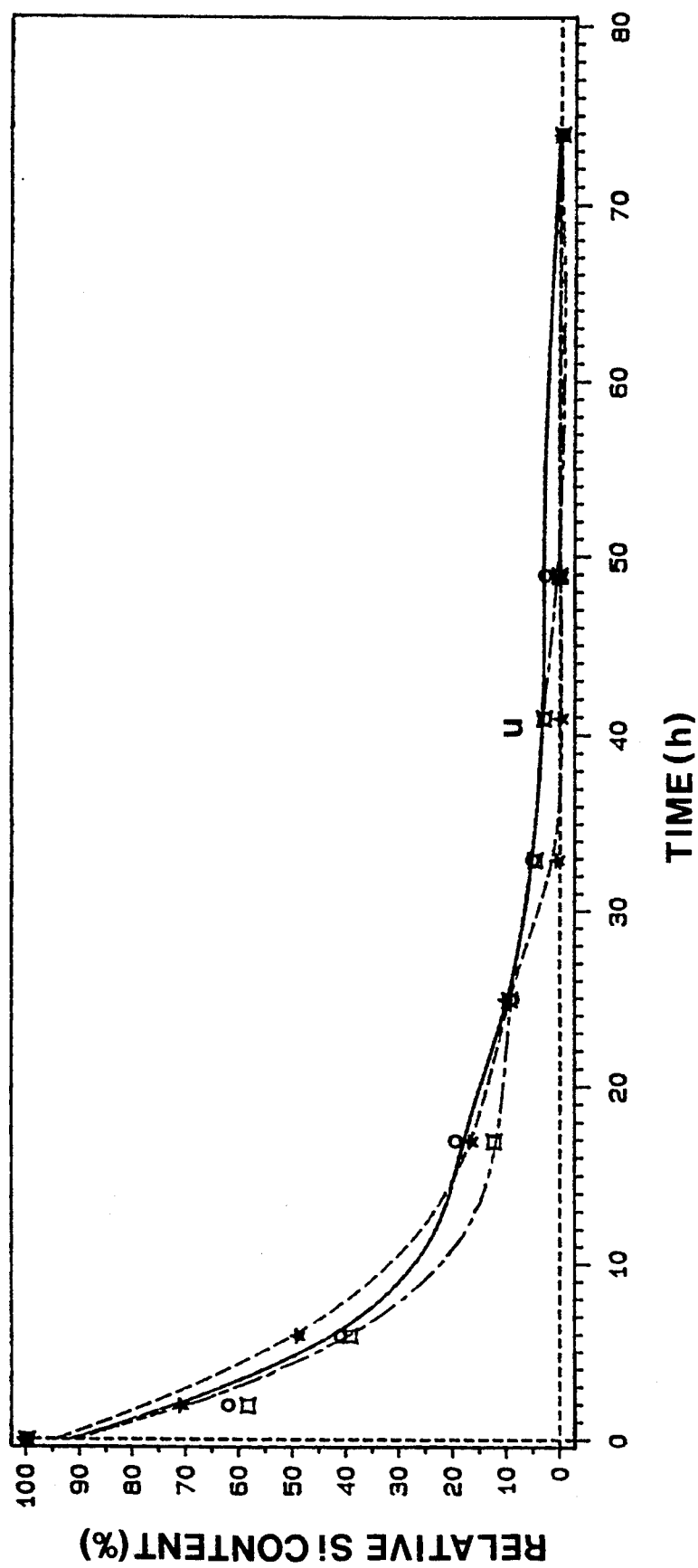
Figure 3:
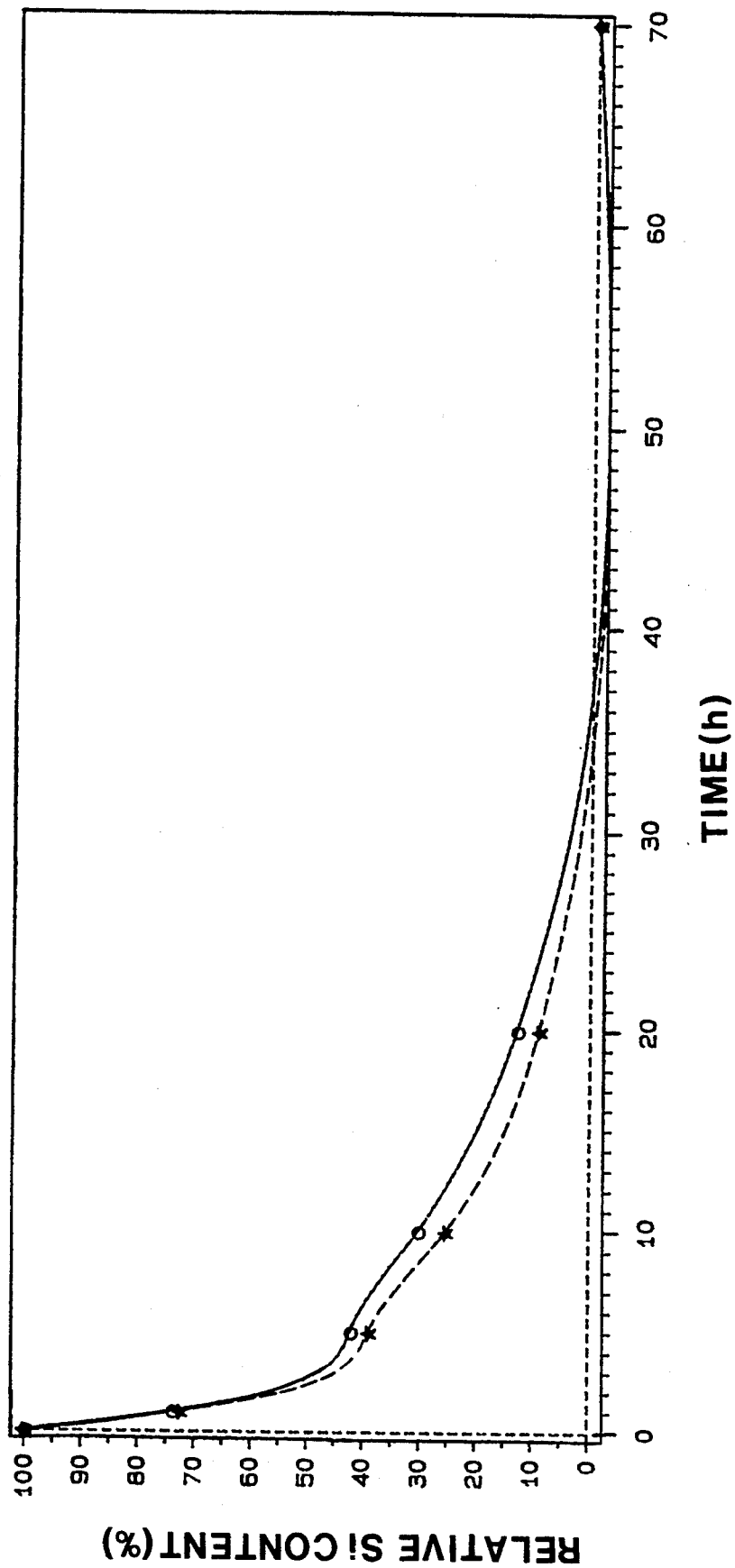

The invention will be illustrated below by a few non-restrictive Examples, reference being had to the accompanying drawings in which FIG. 1 illustrates the volatility of a number of known precuring retarders and a number of precuring retarders according to the invention, FIG. 2 illustrates the escape of a number of known precuring retarders from a polymer composition, and FIGS. 3 and 4 illustrate the escape of a number of known precuring retarders and a number of precuring retarders according to the invention from a polymer composition.

EXAMPLE 1

The volatility of the most preferred precuring retarders according to the invention, $CH_3(CH_2)_pSi(OCH_3)_3$, wherein p is 13, 15 and 17, respectively, and a number of compounds according to prior art technique included for comparative purposes, was determined by means of a thermogravimetric analysis (TGA) of the pure compounds in nitrogen atmosphere. The analysis was carried out at a heating rate of 5° C./min from 30° C. until the sample had volatilised. The following compounds were tested:

| | | |
|---|---|---|
| 1. $CH_2=CHSi(OCH_3)_3$ "O" in FIG. 1 | | (prior art technique) |
| 2. $(CH_3)_2CHCH_2Si(OCH_3)_3$ "★" in FIG. 1 | | (prior art technique) |
| 3. $CH_2=C(CH_3)COOCH_2CH_2CH_2Si(OCH_3)_3$ "♀" in FIG. 1 | | (prior art technique) |
| 4. $CH_3(CH_2)_7Si(OCH_3)_3$ "♥" in FIG. 1 | | (prior art technique) |
| 5. $CH_3(CH_2)_9Si(OCH_3)_3$ "◇" in FIG. 1 | | (prior art technique) |
| 6. $CH_3(CH_2)_{11}Si(OCH_3)_3$ "♥" in FIG. 1 | | (prior art technique) |
| 7. $CH_3(CH_2)_{13}Si(OCH_3)_3$ "■" in FIG. 1 | | (the invention) |
| 8. $CH_3(CH_2)_{15}Si(OCH_3)_3$ "▲" in FIG. 1 | | (the invention) |
| 9. $CH_3(CH_2)_{17}Si(OCH_3)_3$ "*" in FIG. 1 | | (the invention) |
| 10. $CH_2=CHSi(OCH_2CH_3)_3$ "●" in FIG. 1 | | (prior art technique) |

The results are apparent from FIG. 1.

Not unexpectedly, the results show that the volatility decreases as the length of the alkyl group bound to the silicon atom increases.

EXAMPLE 2

The escape of a number of previously known precuring retarders from a polymer composition comprising a copolymer of ethylene and 2% by weight of vinyltrimethoxy silane was measured during storage at a constant temperature of 60° C. The tested precuring retarders, their boiling points, and the amount of precuring retarder added To the polymer composition, are apparent from Table 1, while the test results are apparent from FIG. 2

TABLE 1

| Precuring retarder | Boiling point (°C.) | Amount of retarder in the polymer (% by weight) | Hydrolysable groups (mole/1000 g) |
|---|---|---|---|
| Vinyltrimethoxy silane (VTMS) (□ in FIG. 2) | 123 | 0.55 | 0.111 |
| Isobutyltrimethoxy silane (IBTMO) (O in FIG. 2) | 152 | 0.48 | 0.080 |
| Gamma-methacryloxy propyltrimethoxy silane (MEMO) (✗ in FIG. 2) | 255 | 0.46 | 0.056 |

TABLE 1-continued

| Precuring retarder | Boiling point (°C.) | Amount of retarder in the polymer (% by weight) | Hydrolysable groups (mole/1000 g) |
|---|---|---|---|
| propyltrimethoxy silane (MEMO) (✗ in FIG. 2) | | | |

As is apparent from FIG. 2, the escape of the precuring retarder from the polymer composition during storage at 60° C. is about the same, regardless of the boiling point of the precuring retarder. As mentioned earlier, this shows that the escape chiefly is due to the compatibility between the precuring retarder and the polymer composition, and not to the boiling point of the precuring retarder.

EXAMPLE 3

The escape of a number of previously known precuring retarders and a number of preferred precuring retarders according to the invention, from a polymer composition consisting of a copolymer of ethylene and 2% by weight of vinyltrimethoxy silane, was measured during storage at a constant temperature of 60° C. The following compounds were tested:

| | | | |
|---|---|---|---|
| 1. $CH_3(CH_2)_2Si(OCH_3)_3$ | (prior art technique), | "O" in FIG. 3 | |
| 2. $CH_3(CH_2)_7Si(OCH_3)_3$ | (prior art technique), | "✗" in FIG. 3 | |
| 3. $CH_3(CH_2)_{11}Si(OCH_3)_3$ | (prior art technique), | "□" in FIG. 4 | |
| 4. $CH_3(CH_2)_{13}Si(OCH_3)_3$ | (the invention) | "O" in FIG. 4 | |
| 5. $CH_3(CH_2)_{15}Si(OCH_3)_3$ | (the invention) | "✦" in FIG. 4 | |
| 6. $CH_3(CH_2)_{17}Si(OCH_3)_3$ | (the invention) | "♣" in FIG. 4 | |

The results are shown in FIGS. 3–4, where "relative Si content (%)" denotes the precuring retarder content in the polymer composition. In compounds 1 and 2 (FIG. 3), the initial precuring retarder content was 0.5% by weight, and in compounds 3–6 (FIG. 4) 2% by weight. It is clear from FIGS. 3 and 4, that the precuring retarders according to prior art technique rapidly escape from the polymer composition, such that the precuring retarder content after only a short time of storage at 60° C. has been reduced to less than half its original value. Consequently, either the effect counteracting precuring will be unsatisfactory, or one has to add excessive amounts of precuring retarders already at the beginning, to obtain a satisfactory effect. Unlike what is the case with previously known precuring retarders, the content of the precuring retarder according to the invention remains almost constant in the polymer composition during the entire storage period.

EXAMPLE 4

The escape of precuring retarders having two silicon atoms in the molecule was tested, and the precuring retarders were the following:
A. $(CH_3O)_3Si(CH_2)_8Si(OCH_3)_3$
B. $(CH_3O)_3Si(CH_2)_2Si(OCH_3)_3$ compound A being a retarder according to the invention, and compound B being outside the scope of the invention.

Retarders A and B were admixed to a polymer composition consisting of a copolymer of ethylene and 2% by weight of vinyltrimethoxy silane. The escape of the retarders was measured during storage at a constant temperature of 60° C. during 74 h. The results are apparent from Table 2.

| Retarder | Admixed amount of retarder | | Remaining after storage during 74 h at 60° C. | |
|---|---|---|---|---|
| | % by weight | Mole —OCH$_3$/1000 g | % by weight | Mole —OCH$_3$/1000 g |
| A | 0.72 | 0.122 | 0.42 | 0.0712 |
| B | 0.275 | 0.061 | 0 | 0 |
| B | 0.55 | 0.122 | 0 | 0 |

As is plain from Table 2, the precuring retarder A according to the invention only escaped to a limited extent during storage for 74 h at 60° C., and it was therefore possible for the compound to efficiently counteract precuring. On the other hand, the precuring retarder B, which is outside the scope of the invention, completely escaped from the polymer composition during storage for 74 h at 60° C., and the composition lost its counteracting effect.

We claim:

1. A crosslinkable polymer composition comprising:
   (a) an olefin copolymer or an olefin graft copolymer with hydrolyzable silane groups thereon;
   (b) a silanol condensation catalyst; and,
   (c) a substance which counteracts precuring of the polymer composition and which comprises a silane compound having at least one hydrolyzable organic group;
      (i) the silane compound having a compatibility with the polymer composition of at least 0.035 mole hydrolyzable groups per 1000 g polymer composition; the compatibility being defined as the residual content of moles of hydrolyzable groups per 1000 g polymer composition, determined indirectly by measuring the decrease in weight after storage for 74 hours at 60° C. in air, of a polymer composition with an initial content of 0.060 mole hydrolyzable groups per 1000 g polymer composition;
      (ii) the silane compound having the general formula:

$$R^1(SiR^2{}_nX_{3-n})_m \qquad \text{I}$$

wherein:
   $R^1$ is a monofunctional hydrocarbyl group having 13-30 carbon atoms, or a difunctional hydrocarbyl group having 4-24 carbon atoms;
   $R^2$ which may be the same or different, is a hydrocarbyl group having 1-10 carbon atoms;
   X which may be the same or different, is a hydrolyzable organic group;
   n is 0, 1 or 2; and,
   m is 1 or 2.

2. A polymer composition according to claim 1 wherein m is 1, $R^1$ is a monofunctional hydrocarbyl group having 13-20 carbon atoms, and $R^2$ is a hydrocarbyl group having 1-7 carbon atoms.

3. A polymer composition according to claim 1 wherein the silane compound has the formula (V):

$$CH_3(CH_2)_pSi(OCH_3)_3 \qquad (V)$$

wherein p is 13, 15 or 17.

4. A polymer composition as claimed in claim 1, characterised in that m is 2, $R^1$ is a difunctional hydrocarbyl group having 8-16 carbon atoms, n is 0, and X is a hydrocarbyloxy group having 1-5 carbon atoms.

5. A polymer composition according to claim 1 wherein, the silane compound has the formula (VII):

$$(CH_3O)_3Si(CH_2)_qSi(OCH_3)_3 \qquad (VII)$$

wherein q is 8-16.

6. A polymer composition according to claim 1, wherein the polymer is a copolymer or graft polymer of ethylene and an ethylenically unsaturated silane compound with at least one hydrolysable organic group.

7. A polymer composition according to claim 6, wherein the unsaturated silane compound has the general formula (II):

$$RSiR'{}_nY_{3-n} \qquad (II)$$

wherein:
R is an ethylenically unsaturated hydrocarbyl, hydrocarbyloxy, or (meth)acryloxyhydrocarbyl group,
R' is an aliphatic saturated hydrocarbyl group,
Y which may be the same or different, is a hydrolysable organic group, and
n is 0, 1 or 2.

8. A polymer composition according to claim 6 wherein the copolymer contains, in addition to ethylene and an ethylenically unsaturated silane compound, up to 30% by weight of other copolymerisable monomers.

9. A polymer composition according to claim 1 including 0.001-10% by weight of a silanol condensation catalyst, and 0.01-5% by weight of a silane compound.

10. A polymer composition according to claim 6 wherein the ethylenically unsaturated silane compound constitutes 0.001-15% by weight of the polymer.

* * * * *

UNITED STATES PATENT AND TRADEMARK OFFICE
CERTIFICATE OF CORRECTION

PATENT NO. : 5,350,812
DATED : September 27, 1994
INVENTOR(S) : Bernt-Ake Sultan et al It is certified that error appears in the above-indentified patent and that said Letters Patent is hereby corrected as shown below:

Title page, item [75], Inventors, after the word "of", insert —Sweden—.
Column 2, line 6, delete "hydrolyrically" and insert therefor —hydrolytically—.
Column 2, line 32, delete "hydrolyrically" and insert therefor —hydrolytically—.
Column 9, line 5, "FIG. 2" does not start a new paragraph, it should be moved to line 4.
Column 12, lines 15 and 16, after the words "claim 1", delete —characterised in that—.
Column 12, line 15, delete "as claimed in claim 1" and replace with —according to claim 1—.
Column 12, line 15, after the numeral "1", insert —wherein—.

Signed and Sealed this

Seventeenth Day of October, 1995

Attest:

BRUCE LEHMAN

*Attesting Officer*         *Commissioner of Patents and Trademarks*